United States Patent [19]

Remson

[11] Patent Number: 5,070,439
[45] Date of Patent: Dec. 3, 1991

[54] DC TO DC CONVERTER APPARATUS EMPLOYING PUSH-PULL OSCILLATORS

[75] Inventor: Joseph D. Remson, San Jose, Calif.
[73] Assignee: Rolm Corporation, Santa Clara, Calif.
[21] Appl. No.: 668,005
[22] Filed: Mar. 12, 1991
[51] Int. Cl.[5] .......................................... H02M 3/337
[52] U.S. Cl. ....................................... 363/22; 363/24; 323/266; 323/907
[58] Field of Search ..................................... 363/22–25, 363/133; 323/266, 282, 284, 907

[56] References Cited

U.S. PATENT DOCUMENTS

| | | | |
|---|---|---|---|
| 4,150,423 | 4/1979 | Boschert | 363/24 |
| 4,755,923 | 7/1988 | Maeba et al. | 363/23 X |
| 4,783,795 | 11/1988 | Yahata | 363/24 X |
| 4,905,136 | 2/1990 | Tanaka | 363/24 X |
| 5,029,062 | 7/1991 | Capel | 363/25 X |

Primary Examiner—Steven L. Stephan
Assistant Examiner—Emanuel Todd Voeltz

[57] ABSTRACT

A DC to DC converter employs a push-pull oscillator which employs a transformer having a primary winding and a plurality of secondary windings. The transformer has a core which is of a square loop hysteresis type. The push-pull oscillator is supplied operating voltage by means of a voltage regulator circuit which operates to regulate the voltage applied to the push-pull oscillator according to both input voltage variations and output load variations. An output secondary winding of the transformer is coupled to a full wave rectifier. The full wave rectifier output is fed back to the regulator to control the voltage applied to the push-pull oscillator via the regulator. Due to circuit operation, the output voltage is extremely well regulated while having low ripple.

20 Claims, 6 Drawing Sheets

DC TO DC CONVERTER APPARATUS EMPLOYING PUSH-PULL OSCILLATORS

BACKGROUND OF THE INVENTION

This invention generally relates to power supplies and more particularly to a DC to DC converter employing a push-pull oscillator.

DC to DC converters are well known and operate to convert an available DC input voltage to a DC output voltage or multiple output voltages with isolation between the input and the output. Such converters normally utilize high frequency switching techniques to enable one to achieve small transformer size which, in turn, provides isolation and voltage scaling. There are many different types of converters each having specific advantages and disadvantages. For example, square wave inverter stages may be used where the secondary voltage of a transformer is rectified and filtered to provide a desired DC output. With the square wave inverter the output voltage is not regulated and is a function of the input voltage and load current. However, for fixed input voltages and fixed loads, the output voltage may be maintained to a desired voltage tolerance. Where voltage output regulation is required due to input voltage and output load variations, regulation is conveniently achieved by pulse width modulation which controls the conduction period or duty cycle of an active device. As indicated a DC input source may be employed but most frequently a rectified and filtered AC input source serves as the DC source as in the case of off-line switch mode power supplies. Low power converters typically employ bipolar transistors or MOSFETs while very high power converters normally employ SCRs as switching elements. Each different approach has certain advantages. In the prior art it has been known, for example, to employ a free-running oscillator or a free-running circuit configuration to convert the DC voltage to an AC voltage which AC voltage is then rectified to produce a final output DC voltage. The term "free-running converter" implies that the operation of the converter is controlled by volt-second parameters of magnetic components. The switching frequency and the output voltage vary as a function of input voltage and load current. These converters are ideal for low power requirements and for operation from a fixed voltage source and into a fixed load. Essentially the prior art employed various free-running configurations to implement such converters including blocking oscillators and other circuit configurations. For examples of typical converter operation reference is made to a text entitled PRINCIPLES OF SOLID STATE POWER CONVERSION by Ralph E. Tarter (1985) published by Howard W. Sams & Company, Inc. As one can ascertain, while DC to DC converters are well known, there are many problems associated with each different approach and such problems have to be resolved accordingly. These problems relate to regulation of the output voltage, the amount of ripple, volumetric size, as well as the overall economics.

It is therefore an object of the present invention to provide a compact DC output voltage source having a regulated output voltage including low ripple.

It is a further object of the present invention to provide a regulated output DC voltage source having low ripple, small size, and which is relatively inexpensive to produce.

SUMMARY OF THE INVENTION

A DC to DC converter apparatus, comprising: a push-pull oscillator having first and second transistors each having a base, collector and emitter electrode which the emitter electrodes coupled to a point of reference potential, a transformer having a center tapped primary winding with a first terminal of said primary winding coupled to said collector electrode of said first transistor, with a second terminal of said primary winding coupled to the collector electrode of said second transistor, said transformer having first, second and third secondary windings, with said center tap of said transformer coupled to the base electrode of said first transistor via said first secondary winding and coupled to the base electrode of said second transistor via said second secondary winding, to cause said push-pull oscillator to provide a high frequency square wave output, rectifier means coupled to said third secondary winding to supply an output voltage by rectifying said high frequency square wave, voltage regulator means coupled to said center tap of said primary winding and adapted to supply a regulated voltage thereto, means coupled between said rectifier means and said regulator means and operating to vary the value of said regulated voltage applied to said center tap according to the value of said output voltage and according to the temperature of operation and always in a direction to maintain said output voltage constant.

DETAILED DESCRIPTION OF THE INVENTION

Figure 1:
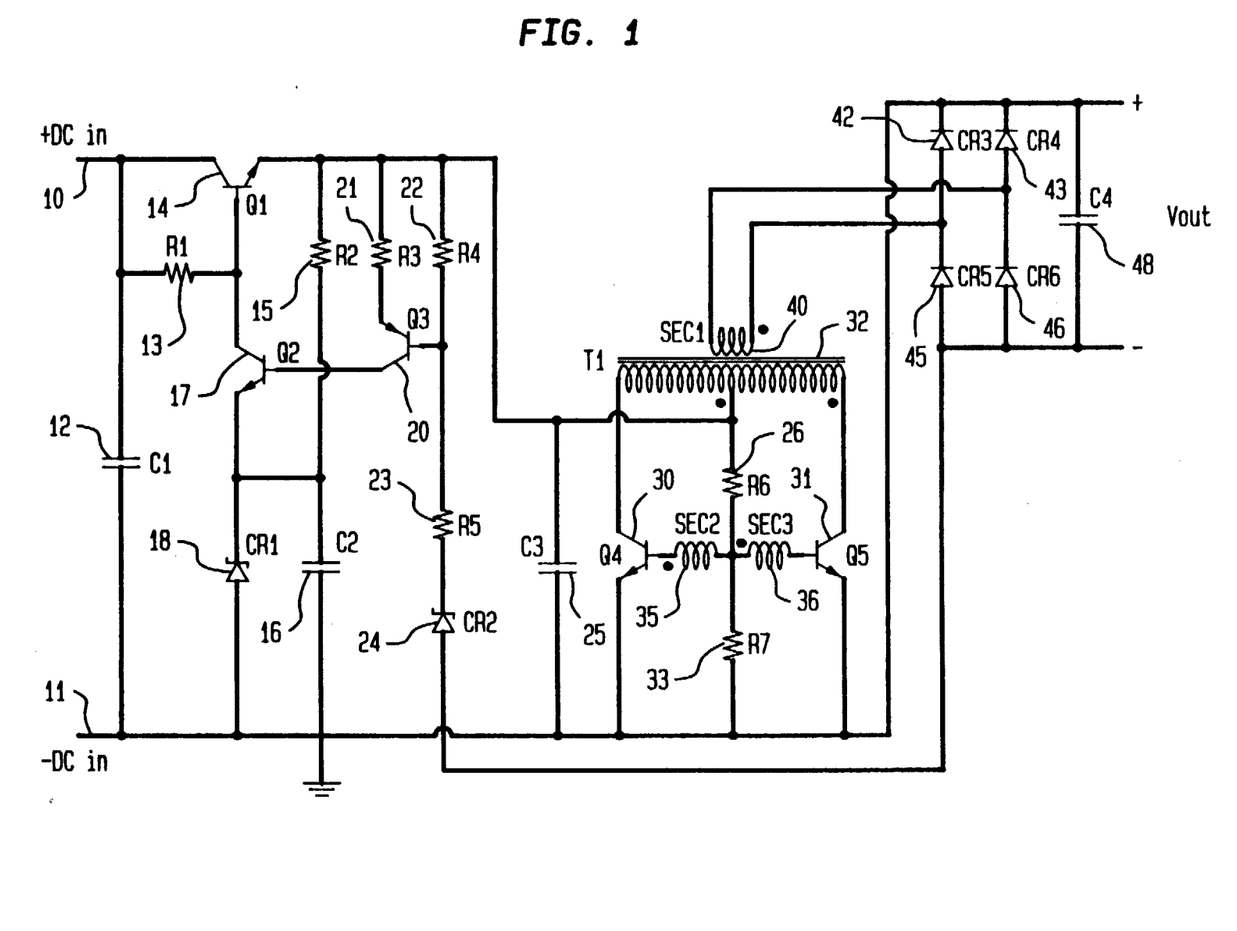
FIG. 1 is a detailed circuit schematic diagram of a DC to DC convert according to this invention.

Referring to FIG. 1 there is shown a schematic diagram of a voltage source employing a DC to DC converter according to the principles of this invention. Essentially, the voltage source receives an input DC voltage of a given level and provides an output DC voltage at another level. The voltage source depicted in FIG. 1 is particularly useful in systems which have volumetric limitations and where line and load regulation is required. The voltage source to be described has excellent line and load regulation while providing line to load and load to line noise isolation. The noise isolation is important to prevent electrical noise from providing degradation of signal quality of the system. Thus in this manner the operation of the DC to DC converter is at a much higher rate than, for example, audio signals which may be employed in the system. The DC to DC converter shown can be used as a power source in a telephone switching system or in similar applications. Basically, the converter shown in FIG. 1 consists of an input voltage regulator stage including transistors 14, 17, and 20 which provides a regulated voltage to a free-running push-pull oscillator including transistors 30 and 31. The output waveform of the push-pull oscillator is coupled to a secondary winding 40 where it is converted into a DC output voltage by means of a full wave rectifier including diodes 42, 43, 45, and 46. An input voltage source is applied between terminals 10 and 11, also designated as +DC In and −DC In. A filter capacitor 12 is coupled between the input terminals 11 and 11 The collector electrode of transistor 14 is coupled to terminal 10 to receive operating potential. The base electrode of transistor 14 is biased by means of resistor 13 so that it is conducting. The emitter electrode of transistor 14 supplies a regulated voltage to the center tap of the primary winding 32 of transformer T-1 forming part of the push-pull oscillator. This regulated voltage, as will be explained, is controlled according to the output and input voltages. Transistor 14 which is an NPN device is, as shown, arranged in a common emitter configuration. The emitter electrode of transistor 14 is returned to the point of reference potential via the series combination of resistor 15 in series with capacitor 16. The base electrode of transistor 14 is coupled to the collector electrode of NPN transistor 17. The emitter electrode of transistor 17 is coupled to the point of reference potential through a Zener diode 18 with the anode of the Zener diode coupled to the point of reference potential and the cathode of the Zener diode coupled to the emitter electrode of transistor 17. The above-noted capacitor 16 shunts the Zener diode 18 and acts as a filter capacitor. The base electrode of transistor 17 is coupled to the collector electrode of PNP transistor 20 having the emitter electrode coupled via resistor 21 to the emitter electrode of transistor 14. Biasing for the base electrode of transistor 20 is obtained via resistor 22 which is coupled between the base electrode of transistor 20 and the emitter electrode of transistor 14. The base electrode of transistor 20 is further coupled through a resistor 23 in series with a Zener diode 24 to the output of the full wave rectifier and provides a feedback path for the regulator. As indicated, the emitter electrode of transistor 14 supplies a regulated voltage. Capacitor 25 acts as a filter capacitor and is connected between the emitter electrode of transistor 14 and the point of reference potential. Thus the emitter electrode of transistor 14 is coupled to the center tap of a primary winding 32 of the transformer T1. The center tap of the primary winding 32 is coupled to the point of reference potential via resistors 26 and 33. The junction between resistors 26 and 33 is coupled to the base electrodes of transistors 30 and 31 forming part of the push-pull oscillator. As seen, each base electrode is coupled to the junction between resistors 26 and 33 via a respective secondary winding of transformer T1. In this manner the base electrode of transistor 30 is coupled to the junction via secondary winding 35 while the base electrode of transistor 31 is coupled to the junction via the secondary winding 36. The primary winding 32 has a first terminal coupled to the collector electrode of transistor 30 with the emitter electrode of transistor 30 coupled to reference potential. The other terminal of the primary winding 33 is coupled to the collector electrode of transistor 31 whose emitter electrode is also coupled to the point of reference potential. Current flows in the windings according to the dots depicted on the figure and based on conventional standards. The primary winding is magnetically coupled to an output secondary winding 40 which output secondary winding is coupled to a full wave bridge rectifier including diodes 42, 43, 45, and 46. Thus the anodes of diodes 45 and 46 are coupled together to form the negative terminal of the output supply. The cathode of diode 45 is coupled to the anode of diode 42 with the junction coupled to one terminal of the secondary winding 40. In a similar manner, the cathode of diode 46 is coupled to the anode of diode 43 which junction is coupled to the other terminal of the secondary winding 40. The cathodes of diodes 42 and 43 are coupled together to form the positive output terminal for the output voltage. The positive and negative terminals have coupled therebetween an output capacitor 48 which operates as a filter capacitor. The negative terminal or the junction between the anodes of diodes 45 and 46 is directed back to the anode of the Zener diode 24 and coupled via resistor 23 to the base electrode of PNP transistor 20, forming part of the voltage regulator.

Figure 2A:
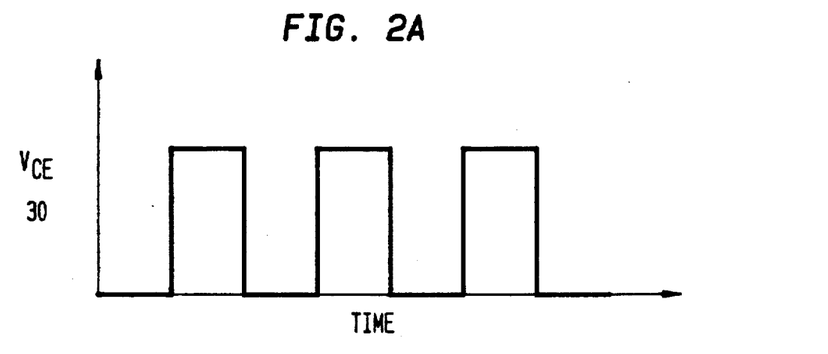
FIGS. 2A-2D are a series of waveforms depicting the voltages across the transistors employed in a free-running push-pull oscillator.
Figure 2B:
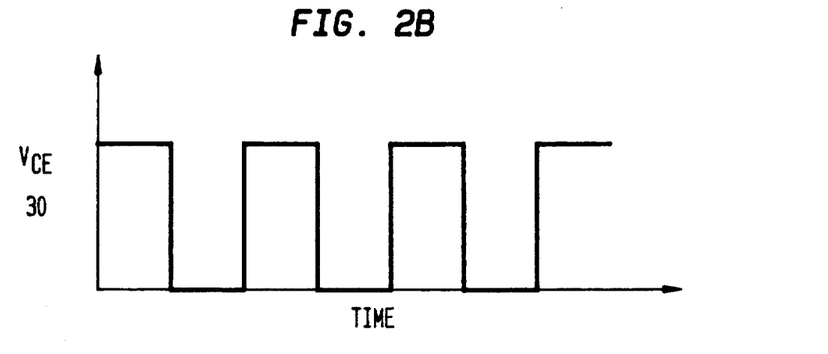
Figure 2C:
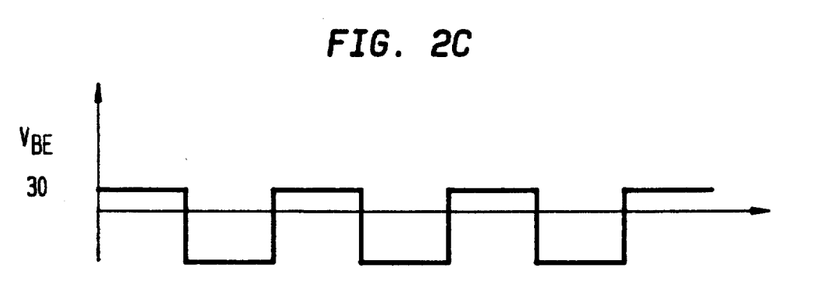
Figure 2D:
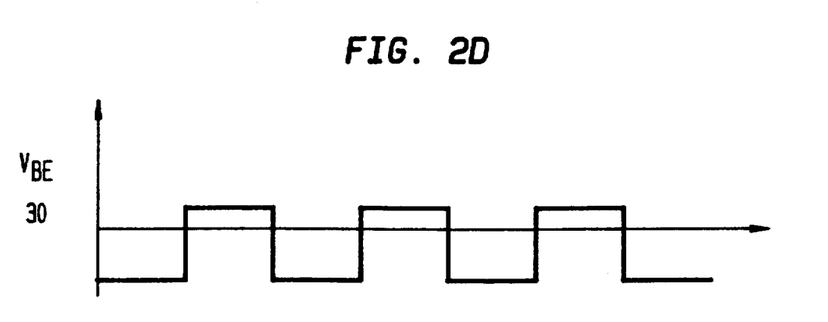
Figure 3:
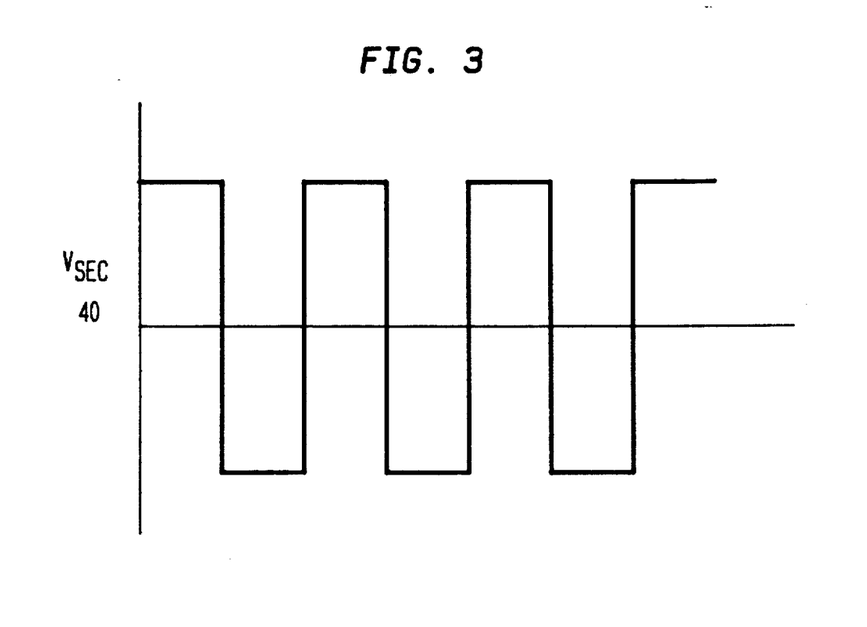
FIG. 3 is a voltage waveform depicting the voltage across the secondary winding of a transformer employed in the DC to DC converter.
Figure 4:
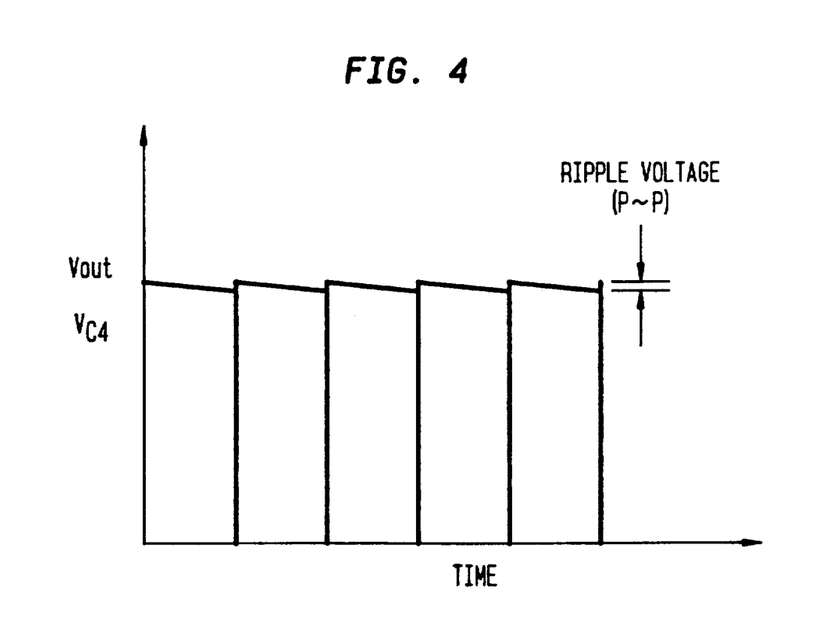
FIG. 4 is a waveform depicting the output voltage according to this invention.
Figure 5:
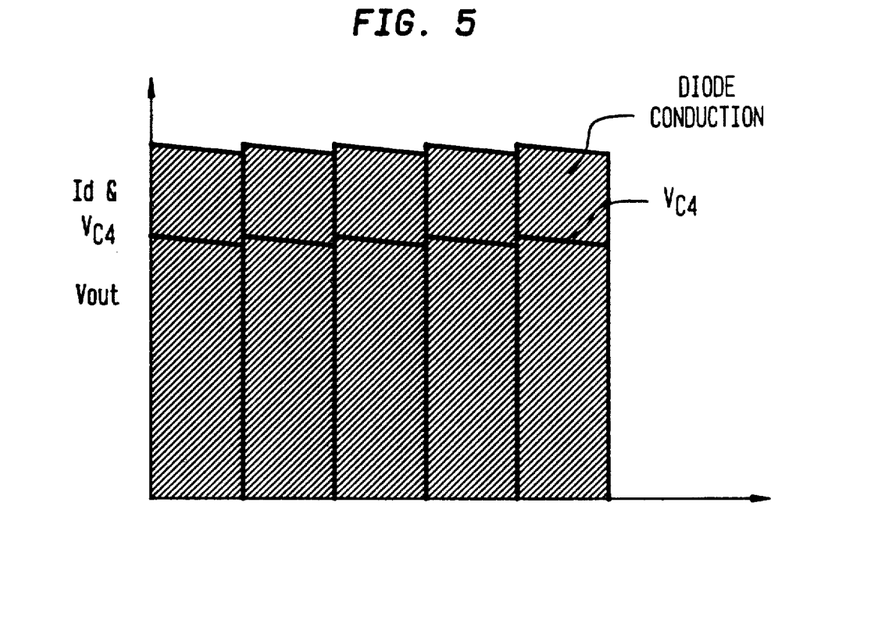
FIG. 5 is another waveform useful to explain the output voltage.
Figure 6:
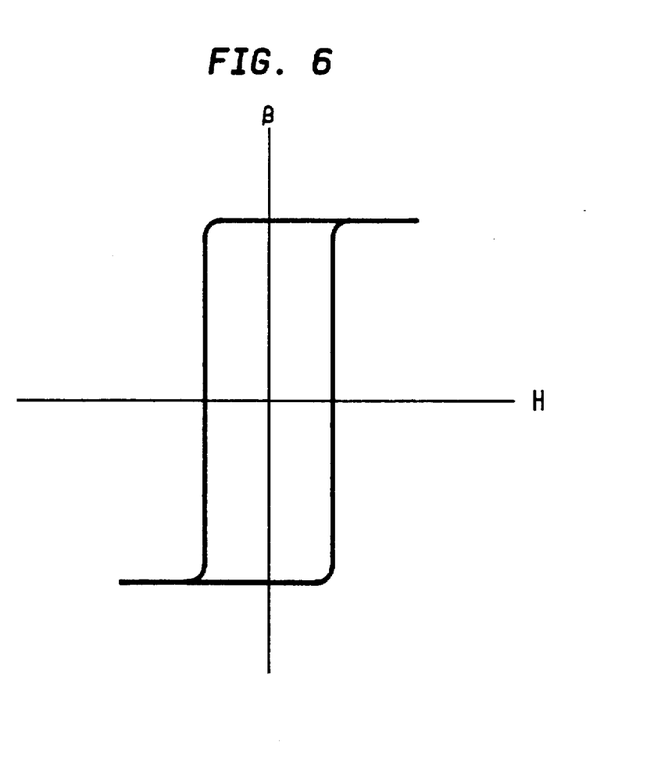
FIG. 6 is a waveform depicting the type of hysteresis employed in a transformer employed with this invention.
Figure 7:
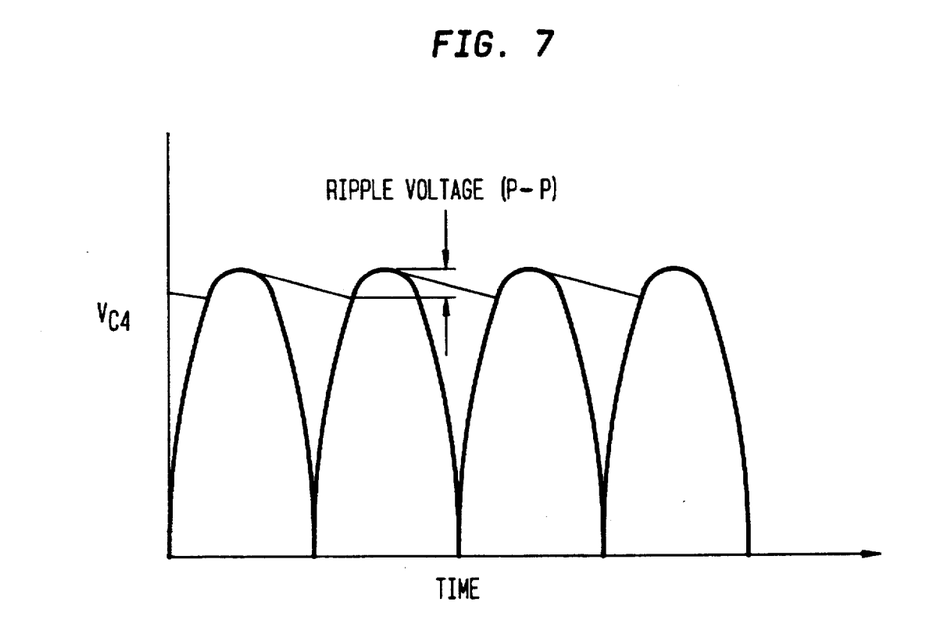
FIG. 7 is a waveform useful in explaining the output voltage variation.
Figure 8:
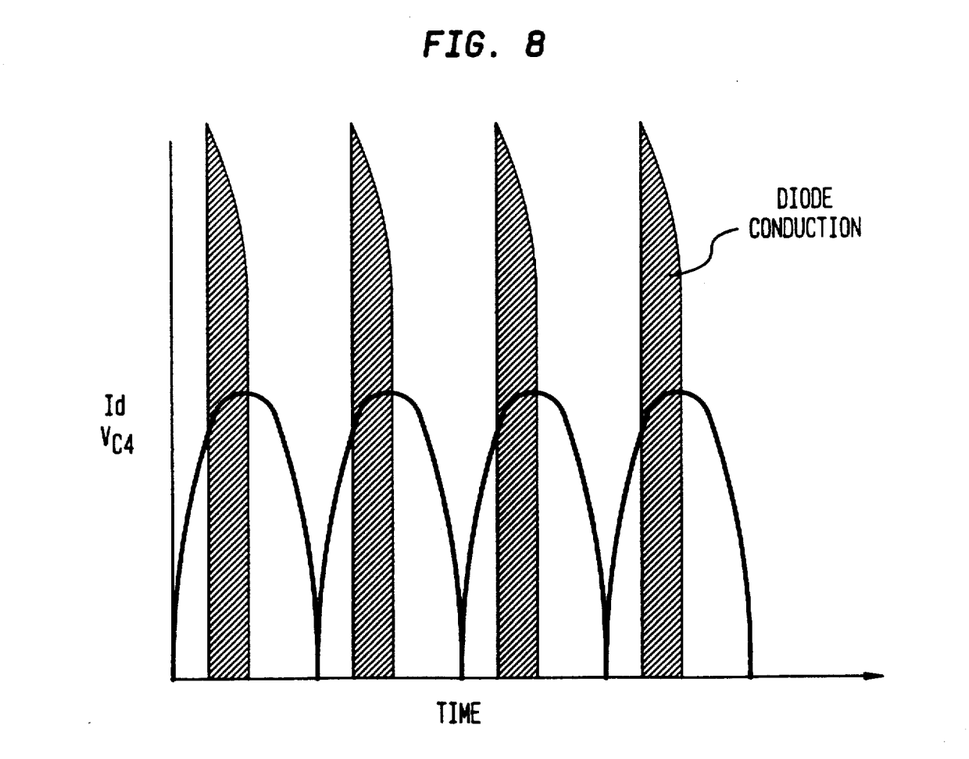
FIG. 8 is another waveform useful in explaining the operation of this invention.
Figure 9:
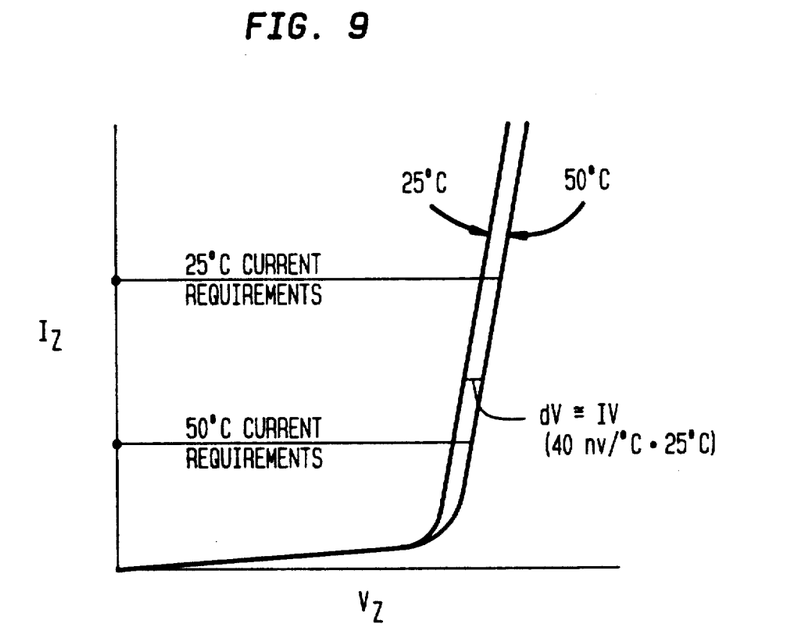
FIG. 9 is a waveform showing the voltage and current relationships of a diode employed in this invention.

Operation of this circuit is as follows. Application of voltage to the center tap of the primary winding 32 biases transistors 30 and 31 towards an "ON" state via resistor 26 and the secondary windings 35 and 36. The transistor circuit oscillates in a push-pull fashion producing waveforms as shown in FIGS. 2A, 2B, 2C, and 2D. FIGS. 2A and 2B depict the waveforms produced respectively at the collector electrodes of transistors 30 and 31. FIGS. 2C and 2D depict the waveforms produced at the base electrodes of transistors 30 and 31. The circuit configuration is designated as a push-pull oscillator and at the start one or the other transistor 30 or 31 will begin to conduct harder due to parametric differences between the transistor characteristics. For present purposes let us assume that transistor 30 is conducting harder than transistor 31. In this manner based on the phasing of the primary winding 32 to the secondary windings 35 and 36, transistor 31 will be driven into cut-off while transistor 30 is driven harder into conduction. Transistor 31 will stay cut-off until transistor 30 goes into saturation. At this time the field in the transformer stops changing and the voltage produced by the secondary windings 35 and 36 drops towards zero. Thus transistor 31 begins to conduct and transistor 30 starts to cut off. The conduction of transistor 31 forces transistor 35 into cut-off by the voltage produced at secondary winding 35. Simultaneously, transistor 31 is driven into hard conduction by the voltage produced at secondary winding 36. The output developed across secondary winding 40 is a full square wave as shown in FIG. 3. This output voltage is then rectified by the full wave bridge formed by diodes 42, 43, 45, and 46. The output has an extremely low ripple voltage as indicated in FIGS. 4 and 5. FIG. 4 shows the output ripple voltage at a given peak-to-peak while FIG. 5 again shows the output ripple voltage as compared to diode conduction. The transformer T1 core exhibits a square hysteresis loop as shown in FIG. 6. Basically in operation, if the power supply is developed from a sine wave source the ripple voltage appears as shown in FIG. 7. As seen in FIG. 7, the voltage droops between peaks of the sine wave because the charge on the output capacitor 48 will cause diodes 42 or 43 to be reversed biased. The diodes in the full wave output rectifier conduct for a very short period of time as shown in FIG. 8. During the interval between conduction of the diodes the voltage across the output capacitor 48 will begin to follow a logarithmic decay, causing a high ripple voltage to appear on the output. The output voltage as indicated is fed back to the regulator circuit through the series combination of Zener diode 24 and resistor 23 As the voltage across capacitor 48 increases, the diode 24 will eventually avalanche. This causes the base voltage of transistor 20 to move in a negative direction. When the base voltage of transistor 20 goes negative, transistor 20 begins to conduct. When transistor 20 begins to conduct, transistor 17 will start to conduct as well. As transistor 17 increases conduction, transistor 14 begins to conduct less, lowering the voltage applied to the primary winding 32 of transformer T1. In this manner regulation is achieved such that if the output voltage rises due to load shifts or the input voltage increases, then transistor 20 conducts more as does transistor 17 which causes transistor 14 to conduct less, reducing the voltage at the input to the transformer. The reduced voltage at the input to the transformer primary winding reduces the output signal from the push-pull oscillator. If the output voltage decreases due to an increased load or due to a reduction in the input voltage then transistor 20 conducts less as does transistor 17. This causes transistor 14 to increase conduction to thereby increase the voltage applied to the primary winding 32 of transformer T-1. Diode 18 and the Vbe of transistors 17 and 20 form a temperature compensation network in conjunction with diode 24. As the temperature increases, the voltage across the diode as well as the voltage from the base to emitter junctions of transistors 17 and 20 decreases. This effectively causes transistor 14 to conduct less. However, most high voltage Zener diodes tend to drift positive with temperature. Since less current is required to cause the regulator to decrease the output of the system, the operating point on diode 24's curve shifts towards a lower voltage point. This is shown in FIG. 9. This action compensates in part for the increase in the Zener voltage across diode 24. Properly balanced, the net effect is a minimal change in the output voltage over the operating temperature range. It is noted that if the output voltage were to remain steady, changes in the input voltage would cause the proper correction to take place by means of transistors 17 and 20. That is, if the voltage increased, then transistor 20 would increase conduction causing transistor 17 to conduct more and thereby decreasing the conduction of transistor 14 to maintain the system stable. The voltage from the base to emitter of transistors 14, 17, and 20 decreases about 2.2 millivolts per degree Centigrade. If feedback from the output can be obtained by means of temperature stable components, then diode 18 should have a positive temperature coefficient. Typical drift values for Zener diodes in the range of 6.3 to 6.8 volts is an increase of about 2.2 millivolts per degree Centigrade. These values virtually offset each other and all temperature drifts. The use of diode 24 in the feedback path provides a higher percentage of the variation in the output than using only resistors. It can be proven mathematically that the use of the diode 24 in the feedback path in conjunction with the resistor 23 improves and provides tighter control over output variations without requiring excessive gain in the regulator circuit. Thus the use of the diode improves circuit operation and provides for a much tighter operation. It is also shown that based on a relatively high frequency of operation, one can use a small filter capacitor. The reduction in capacitor size and volume requirements and cost are achieved if the frequency of operation is increased. A reasonable operating frequency of about 25 Khz or greater represents a reasonable choice. This frequency range was selected based on the availability of high speed rectifiers, transformer cores and other components. The frequency is sufficiently high enough above the audio range as not to interfere with audio signals developed by this system while operating efficiently. An additional advantage of the above type of power supply is that the switching operation of the DC to DC converter provides filtering. In this manner only signals of a frequency equal to the operating frequency and within a certain phase relationship will be able to get through the DC to DC converter. This provides for electromagnetic interference isolation of the equipment from the line and the line from the equipment. Basically, the switching action of the circuit operates as a synchronous demodulator such that only signals of the same frequency and of proper phase angles will be passed. This provides a very high level of isolation between the equipment and the line as required for FCC compliance. Thus the square wave operating characteristics of the circuit provides a means of reducing the ripple voltage in the output section. The output voltage is compensated for changes in the input voltage by means of the feedback scheme incorporated in conjunction with the regulator. The output voltage is also compensated for changes in the load and for changes in the ambient temperature. The high frequency of operation provides a means of reducing the size of the filter capacitor required in the output section and therefore accommodates a significant reduction in the volumetric requirements. The use of the Zener diode 24 in the feedback path improves the operating characteristics related to controlling the output voltage level for line and load regulation while the system operates at a frequency beyond the pass band characteristics of the system and therefore reduces noise related problems. The operation and use of the push-pull oscillator assures that certain harmonics are completely discriminated against as compared to single ended circuit operation. The push-pull circuit described above provides extremely advantageous operating characteristics for the DC to DC converter.

I claim:

1. A DC to DC converter apparatus, comprising:
a push-pull oscillator having first and second transistors each having a base, collector and emitter electrode with the emitter electrodes coupled to a point of reference potential,
a transformer having a center tapped primary winding with a first terminal of said primary winding coupled to said collector electrode of said first transistor, with a second terminal of said primary winding coupled to the collector electrode of said second transistor, said transformer having first, second and third secondary windings, with said center tap of said transformer coupled to the base electrode of said first transistor via said first secondary winding and coupled to the base electrode of said second transistor via said second secondary winding, to cause said blocking oscillator to provide a high frequency square wave output, rectifier means coupled to said third secondary winding to supply an output voltage by rectifying said high frequency square wave, voltage regulator means coupled to said center tap of said primary winding and adapted to supply a regulated voltage thereto, means coupled between said rectifier means and said regulator means and operating to vary the value of said regulated voltage applied to said center tap according to the value of said output voltage and according to the temperature of operation and always in a direction to maintain said output voltage constant.

2. The DC to DC converter according to claim 1, wherein said first and second transistors are NPN transistors.

3. The DC to DC converter according to claim 1, wherein said transformer has a core exhibiting a square hysteresis loop.

4. The DC to DC converter according to claim 1, further including a resistor having one terminal coupled to said center tap of said transformer with said other terminal coupled to a common terminal connection between said first and second secondary windings, with each of said windings coupled to the associated base electrode of said first and second transistors via the other terminal.

5. The DC to DC converter according to claim 1, wherein said high frequency square wave output is at least at a frequency of about 25 Khz.

6. The DC to DC converter according to claim 1, wherein said rectifier means is a full wave bridge rectifier having first, second, third, and fourth diodes, with the cathode electrodes of said first and second diodes coupled together to form one output terminal of said converter, and with the anode electrodes of said third and fourth diodes coupled together to form a second output terminal, and with the anode of said first diode coupled to the cathode of said third diode and connected to one terminal of said third secondary winding and with the anode of said second diode coupled to the cathode of said fourth diode and connected to the other terminal of said third secondary winding.

7. The DC to DC converter according to claim 6, further including a capacitor coupled between said first and second output terminals.

8. The DC to DC converter according to claim 1, wherein said voltage regulator means includes first and second input terminals for receiving a source of potential, a third transistor of a given conductivity having a base collector and emitter electrode, with the collector electrode coupled to said first terminal and with the emitter electrode coupled to said center tap of said primary winding, a fourth transistor of the same conductivity as said third transistor, having a base, collector and emitter electrode with the collector electrode of said fourth transistor coupled to the base electrode of said third transistor and with the emitter electrode coupled to said second input terminal, control means coupling the base electrode of said fourth transistor to said rectifier means for controlling the emitter output of said third transistor according to the rectification of said high frequency square wave.

9. The DC to DC converter according to claim 8, wherein said control means includes a fifth transistor of opposite conductivity to said second and fourth and having a base, emitter and collector electrode with the collector electrode of said fifth transistor coupled to the base electrode of said fourth transistor and with the emitter electrode of said fifth transistor coupled to the emitter electrode of said third transistor and with the base electrode of said fifth transistor coupled to said rectifier means via a diode to provide control of said third transistor according to the magnitude of said output voltage.

10. The DC to DC converter according to claim 9, wherein said diode is a Zener diode.

11. The DC to DC converter according to claim 8, further including a capacitor coupled between said first and second input terminals.

12. The DC to DC converter according to claim 8, wherein said third and fourth transistors are NPN devices.

13. The DC to DC converter according to claim 9, wherein said fifth transistor is a PNP device.

14. The DC to DC converter according to claim 8, further including a Zener diode having an anode and cathode electrode, with the anode electrode coupled to the emitter electrode of said fourth transistor and with the cathode electrode coupled to said second input terminal.

15. The DC to DC converter according to claim 6, wherein said junction between said anode electrodes of said third and fourth diodes of said rectifier means is coupled to said voltage rectifier means.

16. The DC to DC converter according to claim 4, further including another resistor coupled between said common terminal connection between said first and second secondary windings and a point of reference potential.

17. The DC to DC converter according to claim 8, further including a capacitor coupled between said emitter electrode of said third transistor and said second input terminal.

18. The DC to DC converter according to claim 8, further including a DC input source of a lower voltage than said output rectifier voltage adapted to be applied between said first and second terminals.

19. The DC to DC converter according to claim 8, further including a biasing resistor coupled between the base electrode of said third transistor and said first terminal.

20. The DC to DC converter according to claim 14, further including a capacitor coupled across said Zener diode.

* * * * *

UNITED STATES PATENT AND TRADEMARK OFFICE
CERTIFICATE OF CORRECTION

PATENT NO. : 5,070,439

DATED : December 3, 1991

INVENTOR(S) : Joseph D. Remson

It is certified that error appears in the above-identified patent and that said Letters Patent is hereby corrected as shown below:

On title page of patent, Assignee is incorrectly identified as ROLM Corporation. The correct Assignee is ROLM Systems.

Signed and Sealed this

Sixteenth Day of March, 1993

*Attest:*

STEPHEN G. KUNIN

*Attesting Officer*     *Acting Commissioner of Patents and Trademarks*